United States Patent
Ritschel et al.

(10) Patent No.: US 12,393,011 B2
(45) Date of Patent: Aug. 19, 2025

(54) OPTICAL IMAGING SYSTEM, METHODS, SYSTEMS, AND COMPUTER PROGRAMS

(71) Applicant: Leica Microsystems CMS GmbH, Wetzlar (DE)

(72) Inventors: Kai Ritschel, Wetzlar (DE); Mate Beljan, Wetzlar (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 111 days.

(21) Appl. No.: 18/515,339

(22) Filed: Nov. 21, 2023

(65) Prior Publication Data

US 2024/0168274 A1 May 23, 2024

(30) Foreign Application Priority Data

Nov. 22, 2022 (DE) .......................... 102022130872.3

(51) Int. Cl.
  *G02B 21/36* (2006.01)
  *G02B 21/26* (2006.01)
(52) U.S. Cl.
  CPC ........... *G02B 21/367* (2013.01); *G02B 21/26* (2013.01)
(58) Field of Classification Search
  CPC .............................. G02B 21/367; G02B 21/26
  USPC ........................................................... 348/79
  See application file for complete search history.

(56) References Cited

U.S. PATENT DOCUMENTS

2018/0130233 A1* 5/2018 Deck ...................... G01J 3/0275
2020/0161194 A1* 5/2020 Taniguchi ............. H01J 37/226

FOREIGN PATENT DOCUMENTS

| DE | 102018125608 A1 | 6/2019 |
| DE | 102018133188 A1 | 6/2020 |
| DE | 102020126549 A1 | 4/2022 |

\* cited by examiner

*Primary Examiner* — Allen C Wong
(74) *Attorney, Agent, or Firm* — 2SPL Patent Attorneys PartG mbB; Yong Beom Hwang (57) ABSTRACT

Embodiments of the present invention relate to an optical imaging system, and to methods, systems, and computer programs for such an optical imaging system. The methods comprise obtaining first image data of an imaging device of the imaging system, the first image data comprising a representation of a pattern. The methods comprise obtaining second image data of the pattern from the imaging device after the pattern has been displaced by a stage of the optical imaging system by a distance in a dimension defined relative to the stage. The methods comprise determining an offset between the patterns of the first and second image data in two dimensions. The methods comprise calculating a conversion parameter based on the offset and the distance. A first method comprises controlling a drive unit configured to displace the stage based on the conversion parameter.

17 Claims, 8 Drawing Sheets

OPTICAL IMAGING SYSTEM, METHODS, SYSTEMS, AND COMPUTER PROGRAMS

TECHNICAL FIELD

Embodiments of the present invention relate to an optical imaging system, and to methods, systems, and computer programs for such an optical imaging system.

BACKGROUND

Modern microscopes often have motorized stages and use digital detectors (cameras) for imaging. Here, the detectors are often attached externally to a camera mount. In many cases, such microscopes are no longer used by the user looking through one or two microscope eyepieces, wherein even microscopes without eyepieces exist. Instead, the sample is usually viewed via a screen of the microscope or of a computer system connected to the microscope. Nevertheless, the user still expects simple and intuitive operation of the microscope. For example, if the user wants to move the image field to the right, the stage must move to the left accordingly. Such adjustments should be as simple as possible with an input device, such as when the user moves the input device to the right, the image field also moves to the right.

In many cases, the alignment/calibration between the stage and the camera consists of two steps. The first step is to try to align the stage as orthogonally as possible to the optical system so that the axes match. The camera is then connected to the camera mount and rotated and adjusted accordingly until the orientation of the camera corresponds the orientation of the stage. In some cases, an alignment may also be performed to 90, 180, or 270 degrees of twist, with the remaining "error" being corrected by setting the correct camera flip (a camera twist through a right angle, such as 90, 180, or 270 degrees) in the horizontal and/or vertical direction). This may be necessary if the alignment of the camera and the stage is restricted by the available space and the length and placement of the connection cables.

The input device is mostly used to control a corresponding axis of the stage. If the mechanical alignment between the camera and the stage still has a rotational error, this manifests itself in a movement of the image field in two dimensions (X and Y), although the input device was only moved in one axis. Also, the user usually has to manually set the camera flips to fit the stage. For biological samples, flipped image content is less distracting in some cases, but for technical samples, a view and orientation is expected that the user would also have if they were looking at the sample with their own eye.

There may be a demand for providing an improved concept for calibrating an optical imaging system with a stage, wherein the display of the sample as the stage moves meets the expectations of the user of the optical imaging system.

SUMMARY

Said demand is satisfied by the subject matter of the independent claims.

Various embodiments of the present disclosure are based on the recognition that an accurate physical alignment of a stage and an imaging device of an optical imaging system requires significant effort, since both the stage and the imaging device must be rotated, iteratively adjusted, and fixed accordingly. In the event of shocks to the optical imaging system or modifications to the optical imaging system (such as to replace the imaging device with a different one, or to attach a different sample holder on the stage), it may be necessary to perform this alignment again, so the alignment effort is incurred again. Therefore, a concept was created that eliminates the need for such high-precision alignment. In the proposed concept, a pattern is moved through the stage by a predefined distance in a dimension defined relative to the stage. Before and after the movement, the pattern is captured by the imaging device, and an offset of the pattern between the images is determined. This may be used to determine the extent to which the sample has moved, for example relative to a reference image field, not only in one dimension but additionally in a second, indicating a rotational offset between the stage and the image field of the imaging device. Based on this, a conversion parameter may now be calculated, which on the one hand may be used to control a drive unit for displacing the stage (so that the stage is controlled to move according to the dimensions of the reference image field), and on the other hand may be used to transform the image data of the imaging device (so that the image data is rotated and cropped according to the movements of the stage).

Various aspects of the present disclosure relate to a method for an optical imaging system. The method comprises obtaining first image data of an imaging device of the imaging system. The first image data includes a representation of a pattern. The method comprises obtaining second image data of the pattern from the imaging device after the pattern has been displaced by a stage of the optical imaging system by a distance in a dimension defined relative to the stage. The method comprises determining an offset between the patterns of the first and second image data in two dimensions. The method comprises calculating a conversion parameter based on the offset and the distance. The method comprises controlling a drive unit configured to displace the stage based on the conversion parameter. By determining the offset in two dimensions, a rotational offset between the stage and the imaging device may be determined, which is represented by the conversion parameter. This may now in turn be used to adjust the control of the drive unit in order to compensate for the rotational offset. Thus, the movement of the stage as perceived by the user through the imaging device corresponds to the expectations of the user of the optical imaging system.

Mathematically, this may be done by defining different coordinate systems for the stage and for the control of the stage. For example, the dimension defined relative to the stage may be defined by a first coordinate system of the stage. The calculation of the offset in the two dimensions may be performed in a second coordinate system defined relative to a reference image field. The use of multiple coordinate system allows straightforward application of the conversion parameter.

As previously written, the conversion parameter is intended to ensure that the display of the sample as the stage moves meets the expectations of the user of the optical imaging system. For this purpose, the conversion parameter can, for example, be adapted to enable a corresponding displacement in the first coordinate system based on a desired displacement in the second coordinate system in order to control the stage based on the corresponding displacement in the first coordinate system. In other words, the conversion parameter may be used to determine what displacement in the first coordinate system is necessary, and thus what driving of the drive unit is necessary, to achieve the desired displacement in the second coordinate system, and thus of the displayed image, for example.

In particular, the proposed concept may be used to compensate for a rotational offset between the two coordinate systems. Apart from this, the scaling of the offset may also be adjusted by the proposed concept so that the distance by which the stage moves also corresponds to the distance expected by the user. Thus, the conversion parameter may map at least one of a rotational offset and a scaling offset between the first coordinate system and the second coordinate system.

In many cases, the second coordinate system may be a coordinate system of a display of the optical imaging system, i.e., a movement relative to the second coordinate system may correspond to what the user of the optical imaging system sees on the display. This coordinate system may correspond, for example, to the coordinate system of the optical imaging device. In other words, the second coordinate system may be a coordinate system of an image field of the optical imaging device.

In some cases, it may be desired that the second coordinate system differs from the coordinate system of the display. This may be useful, for example, when using so-called corrugated sheets. Corrugated sheets are sample carriers that provide multiple sample cavities (the so-called "wells") that are sealed off from each other. These sample cavities are sometimes arranged in a diagonally offset pattern, or the corrugated plate may be arranged displaced by 45 degrees from the pattern stage. In such cases, it may be desirable for the pattern stage to move diagonally accordingly, rather than according to the display. This may be achieved by the second coordinate system being user-defined, such as adjusted to the arrangement of the wells in the corrugated sheet. In other words, the second coordinate system may be a user-defined coordinate system.

Also, regardless of the use of two coordinate systems, the goal is to have the stage move as the user expects, i.e., relative to the reference image field. Thus, the conversion parameter may be designed to achieve, based on a desired displacement along the dimensions defined relative to a reference image field, a corresponding displacement in dimensions defined relative to the stage to control the stage based on the corresponding desired displacement.

In this embodiment, the conversion parameter is provided to form a translation between a displacement given by the user and the control of the drive unit. This may be done, for example, via a conversion vector which, in the context of vector multiplication, may be used to convert a first vector representing the displacement given by the user into a second vector representing the displacement in dimensions defined relative to the stage. Consequently, the conversion parameter may include a conversion vector to convert between the desired displacement along the dimensions defined relative to the reference image field and the corresponding displacement in dimensions defined relative to the stage.

In the proposed concept, an input device may be used to control the movement of the stage, possibly using the conversion parameter. The method may further include obtaining an input signal of an input device of the optical imaging system. The drive unit for displacing the stage may further be controlled based on the input signal. Thereby, the input signal may be evaluated according to dimensions defined relative to the reference image field, i.e., the input signal is evaluated into a movement relative to the reference image field. Here, the conversion parameter may be used to convert the input signal from the movement relative to the reference image field to a matching control of the stage.

In some cases, for reasons such as available space, the camera may be attached in a different orientation. This may be compensated for by flipping the camera image (via software) if it is known that such a case exists. The proposed concept may be used to recognize and set the imaging flip. In other words, the method may further comprise determining an imaging flip of the imaging device based on the offset. The reference image field used to calculate the offset may be based on the imaging flip, for example.

While the rotational offset may already be determined by the movement in one dimension, the determination of the same may be improved by further considering the movement of the stage in a second dimension (which is orthogonal to the first dimension). In addition, this may be used to determine a scaling offset in the second dimension. The method may further comprise obtaining third image data of the pattern from the imaging device after the pattern has been displaced by a stage of the optical imaging system by a second distance in a second dimension defined relative to the stage. Determining the offset and calculating the conversion parameter may further be based on the displaced representation of the pattern of the third image data.

The present stage is moved by the drive unit. In this respect, the movement performed between the receipt of the first and second image data may also be achieved by controlling the drive unit. The method may thus further comprise controlling the drive unit to displace the stage in order to displace the stage by the predefined distance in the dimension defined relative to the stage.

Some optical imaging systems include multiple imaging devices, such as a camera-based imaging device and a scanning imaging device. These imaging devices may be mounted independently of each other via camera mounts, if necessary, so that their offset is consequently also independent of each other. In this case, the method may be performed separately for each imaging device so that, when all imaging devices are used, the movement of the stage as perceived by the user through the imaging device meets the expectations of the user of the optical imaging system. In other words, if the optical imaging system includes multiple imaging devices, the method may be performed separately for each imaging device. A separate conversion parameter may be calculated for each imaging device.

As explained previously, in addition to using the conversion parameter to control the drive unit, it is also possible to transform the image data according to the conversion parameter, for example to compensate for rotational offset. Various aspects of the present disclosure relate to another method for an optical imaging system. The further method comprises obtaining first image data of an imaging device of the imaging system. The first image data includes a representation of a pattern. The further method comprises obtaining second image data of the pattern from the imaging device after the pattern has been displaced by a stage of the optical imaging system by a distance in a dimension defined relative to the stage. The further method comprises determining an offset between the patterns of the first and second image data in two dimensions. The further method comprises calculating a conversion parameter based on the offset and the distance. The further method comprises transforming image data of the imaging device based on the conversion parameter to obtain transformed image data. The further method comprises providing a display signal with the transformed image data. Hereby, it may also be achieved that the movement of the stage as perceived by the user through the imaging device corresponds to the expectations of the user of the optical imaging system.

This may be achieved, for example, by rotating the image data according to the rotational offset. In other words, transforming the image data may include rotating the image data based on the conversion parameter. In order for the image data to be displayed full afterwards, the rotated image data may be cropped afterwards to hide any empty areas caused by the rotation. Consequently, transforming the image data may further comprise cropping the rotated image data.

Various aspects of the present disclosure relate to a system for an optical imaging system. The system includes one or more processors and one or more storage devices. The system is configured to perform at least one of the aforementioned methods.

Various aspects of the present disclosure relate to a computer program having a program code for performing at least one of the aforementioned methods.

BRIEF DESCRIPTION OF THE FIGURES

Some examples of devices and/or methods will be described in the following by way of example only and with reference to the accompanying figures, in which.

DESCRIPTION

Some examples are now described in more detail with reference to the enclosed figures. However, other possible examples are not limited to the features of these embodiments described in detail. Furthermore, the terminology used herein to describe certain examples should not be restrictive of further possible examples.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements. The term "and/or" includes all combinations of one or more of the associated listed elements and may be abbreviated using "/".

If a singular form, such as "a," "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity.

Although some aspects have been described in the context of a device, it is clear that these aspects also represent a description of the corresponding method, where a block or a device corresponds to a method step or a function of a method step. Analogously, aspects described in the context of a method step also illustrate a description of a corresponding block or item or a property of a corresponding device.

Figure 1A:
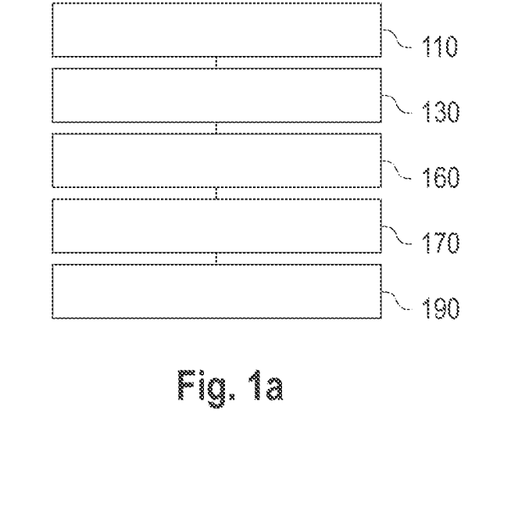
FIGS. 1a and 1b show flowcharts of examples of a method for an optical imaging system.
Figure 1B:
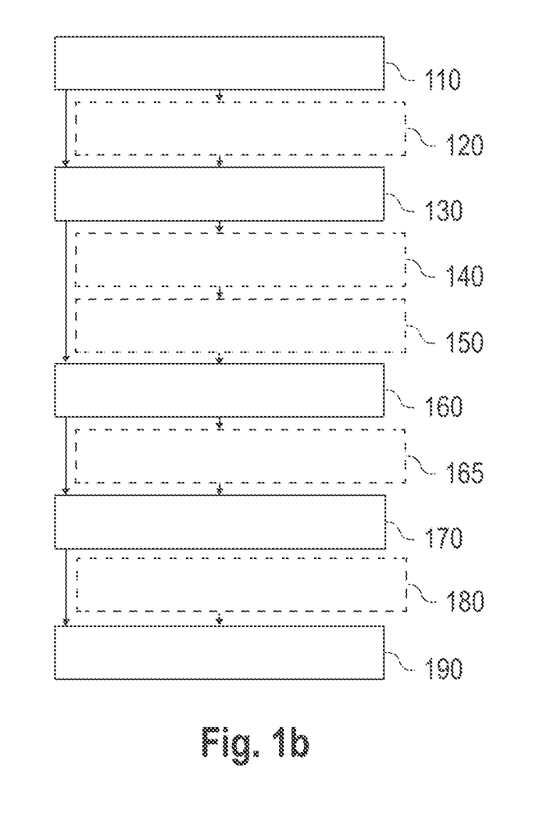
Figure 2A:
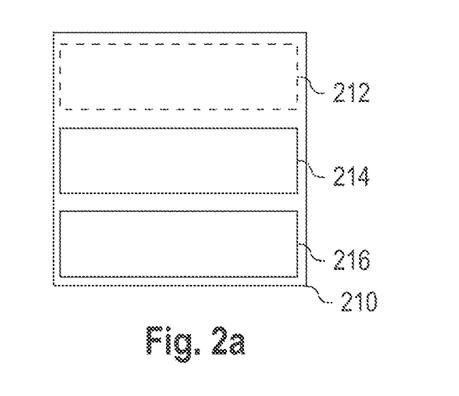
FIG. 2a shows a block diagram of an example of a system for an optical imaging system.
Figure 2B:
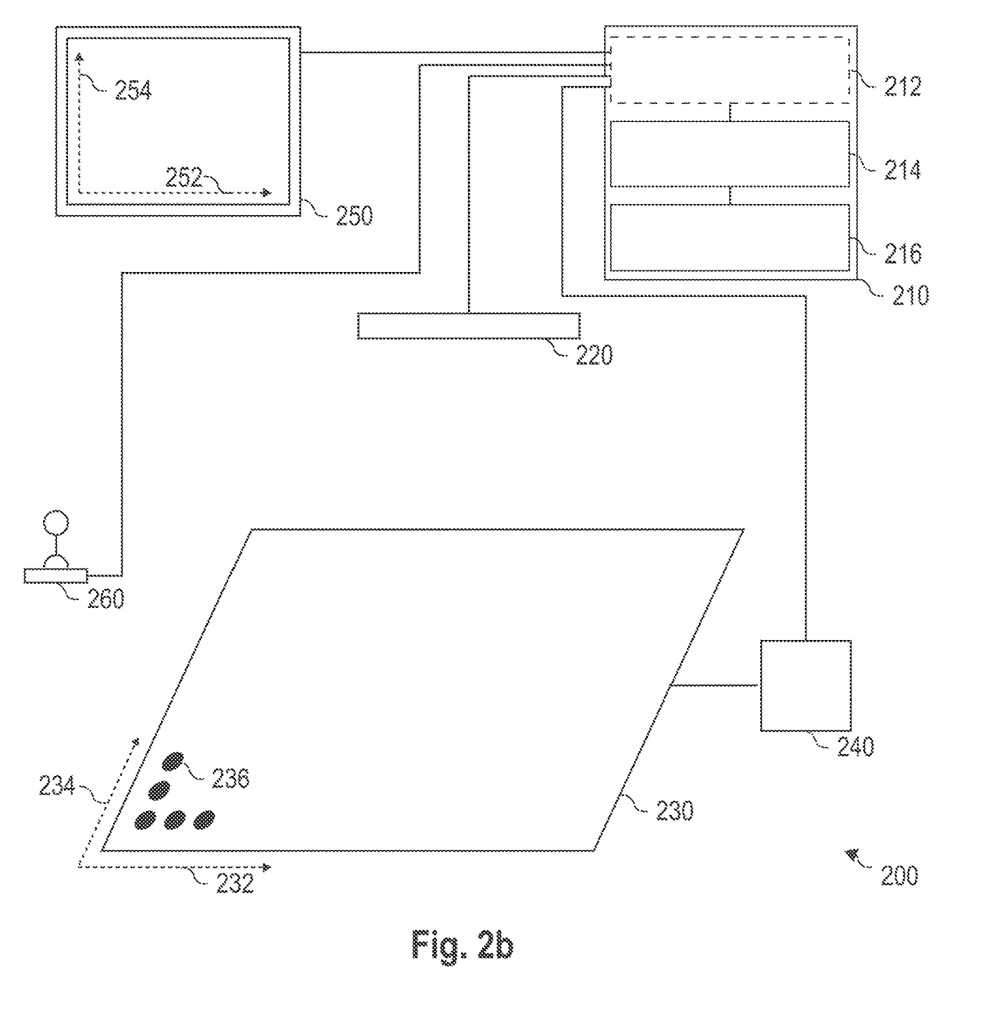
FIG. 2b shows a schematic diagram of an example of an optical imaging system.

FIGS. 1a and 1b show flowcharts of examples of a method for an optical imaging system 200 (shown in FIG. 2b). The method comprises obtaining 110 first image data of an imaging device 220 (shown in FIG. 2b) of the imaging system. The first image data includes a representation 222 (shown in FIG. 2c) of a pattern 236 (shown in FIG. 2b). The method further comprises obtaining 130 second image data of the pattern (having a second representation 224 of the pattern, shown in FIG. 2c) from the imaging device after the pattern has been displaced by a stage 230 (shown in FIG. 2b) of the optical imaging system by a distance in a dimension 232/234 (FIG. 2b) defined relative to the stage. The method further comprises determining 160 an offset 226 (FIG. 2c) between the patterns of the first and second image data in two dimensions 252; 254 (shown in FIGS. 2b and 2c). The method further comprises calculating 170 a conversion parameter based on the offset 226 and the distance. The method further comprises controlling 190 a drive unit 240 (shown in FIG. 2b) to move the stage based on the conversion parameter.

FIG. 1a shows a basic first version of the method. The method may further comprise optional further features shown as blocks with dashed lines in FIG. 1b, which are described in the course of the further description of FIGS. 1a to 2b.

The method of FIGS. 1a and 1b refers to an optical imaging system. FIG. 2b shows a schematic drawing of an example of such an optical imaging system 200. The optical imaging system 200 includes at least one imaging device 220, respectively, and a system 210 configured to perform the method of FIGS. 1a and/or 1b (or the method of FIG. 8). FIG. 2a shows a block diagram of an example of such a system 210 for an optical imaging system. In this context, the system 210 may be implemented as a computer system. For example, the system 210 includes one or more processors and one or more storage devices 216. Optionally, the system 210 may further comprise one or more interfaces 212. The one or more processors 214 are coupled to the one or more storage devices 216 and to the one or more interfaces 212. In this regard, the one or more processors 214 are configured to provide the functionality of the system 210, in interaction with the one or more interfaces 212 (for exchanging information with other components of the optical imaging system, such as the imaging device 220, the drive unit 240, a display 250 of the optical imaging system, or an input device 260) and with the one or more storage devices 216 (for storing and retrieving information, such as machine-readable instructions comprising program code for the one or more processors 214). In general, the functionality of the one or more processors 214 may be implemented by the one or more processors 214 by the one or more processors executing the machine-readable instructions. Accordingly, a functionality attributed to the one or more processors 214 may be defined by one or more instructions from a plurality of machine-readable instructions. The system 210 may contain the machine-readable instructions, for example, in the one or more storage devices 216.

In the following, the features of the method of FIGS. 1*a* and 1*b*, the system of FIG. 2*a*, a corresponding computer program, and the optical imaging system 200 of FIG. 2*b* are explained primarily with reference to the method and the optical imaging system. It is obvious here that features explained in connection with the method may also be transferred to the corresponding system and computer program, since the system is configured to carry out the method and the computer program is an implementation of the method. Further, features explained with reference to the optical imaging system 200 similarly affect the method, the system, and the computer program.

The present concept refers to an optical imaging system. Here, this term is used because the present concept may be applied to a variety of different optical imaging systems. For example, the imaging system may be a microscope system or an exoscope system, wherein an exoscope system is an optical imaging system that, unlike the microscope system, is used exclusively via a screen or a head-mounted display (screen worn similar to a pair of glasses). In addition, an exoscope is usually used from a greater distance. Here, the term "optical imaging system" is used to clarify that, on the one hand, it is a system with optical components, and, on the other hand, it includes other components in addition to the optical components, such as the system 210. The optical imaging system, in addition to the optical components and the system 210, may include other components, such as the input device 260 (such as a touch-sensitive screen, a keyboard, or control buttons), the screen 250, the stage 230, and so forth.

The optical imaging system includes at least one optical component. In the present case, the optical imaging system includes at least the imaging device 220 as an optical component. In some embodiments, the optical imaging system may include multiple imaging devices, such as a camera-based/pixel grid-based imaging device and a scanning imaging device. A scanning imaging device is an optical component configured to generate image data by scanning a plurality of positions of a sample. Examples of a scanning imaging device include a confocal microscope, a two-photon microscope, and a scanning electron microscope.

The method of FIGS. 1*a* and 1*b* refers to an embodiment based on adjusting the control of the drive unit of the stage based on the conversion parameter. Alternatively, or additionally, as is shown in connection with FIGS. 8 and 9, the image data of the imaging device 200 may also be adjusted based on the conversion parameter. Both embodiments are based on calculating the conversion parameter as described below.

This conversion parameter provides the basis for the calibration of the system. The conversion parameter may be used in particular to compensate for a rotational offset between the stage and a reference. For this purpose, the conversion parameter may be established as described below.

Establishing the conversion parameter is based on the comparison of several representations in patterns in image data captured at different times. Between the recordings of the pattern, there is in each case a displacement of the stage with the pattern. For example, the pattern may here be firmly arranged on the stage, such as printed on the stage, or firmly attached to the stage, such as glued on. Alternatively, the pattern may be mounted to the stage as required. For example, the pattern may be imaged on a sample carrier. The sample carrier may in turn be inserted into a sample mount (not shown) of the stage for calibration, or it may be arranged on the stage.

The purpose of the pattern is to be able to track the movement of the stage in the image data. For this purpose, the pattern may have a predefined geometry that may be recognized and tracked by an image processing algorithm. In addition, the pattern may have a high contrast so that it stands out against other elements of the stage. As shown in FIGS. 2*c* to 4*b*, the pattern may be a periodic pattern, i.e., a pattern in which one or more elements (such as dots, dashes, triangles, squares, etc.) are repeated at regular intervals along at least one lateral dimension of the pattern. For example, the pattern may be a two-dimensional periodic pattern, such as a two-dimensional periodic pattern of dots. In some cases, it is further desired that an orientation of the pattern may be recognized in addition to the offset of the pattern in order to recognize an imaging flip of the image data. This is made possible, for example, by the elements of the pattern being anisotropic, i.e., having a directional shape, such as a triangle. On the other hand, this may be made possible by the fact that, if a grid of points is used, the grid has a higher number of elements in one dimension than in the other. As another option, shown in FIGS. 2*b* and 2*c*, the elements of the pattern may be arranged in an L-shaped arrangement.

The pattern is recorded at multiple positions of the stage, so that based on the movement of the pattern between the image data, the movement of the stage may be tracked. To this end, the method comprises obtaining 110 the first image data having the (first) representation 222 of the pattern. After the first image data has been recorded, the stage is moved by the (predefined) distance in the dimension 232/234 defined relative to the stage. This dimension is defined, for example, by the drive unit of the stage. Motorized stages, in particular stages of microscopes, are motorizedly movable mostly in at least two (lateral) dimensions/axes (in the context of the application also called the X- and Y-axis or dimension), which are defined by the motors of the drive unit causing the movement of the stage. For example, the dimensions of the stage may be defined by a first coordinate system of the stage. In other words, the movement of the stage may be controlled by a first coordinate system representing the movement of the stage. Usually two (or a multiple of two) motors are used to move the stage in the two dimensions. To perform the movement of the stage in the dimension defined relative to the stage, only one motor (or a subset of the motors if multiple motors are used per axis) may be used so that the motor moves exclusively along the one axis/dimension of the stage. The method may include, as shown in FIG. 1*b*, controlling 120 the drive unit to displace the stage in order to displace the stage by the predefined distance in the dimension defined relative to the stage. The first coordinate system may be used for this purpose, wherein the position of the stage is displaced along only one dimension/axis in the first coordinate system. After displacing the stage, the second image data is recorded by the imaging device. The method further comprises obtaining 130 the second image data of the pattern (having a second imaging 224 of the pattern) from the imaging device.

Figure 2C:
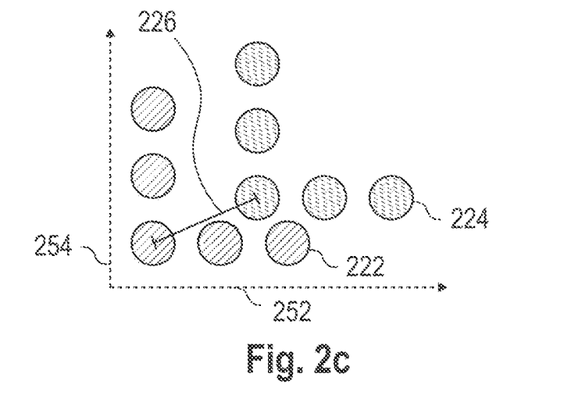
FIG. 2c shows an illustration of a displacement of a pattern in image data.

In many cases, displacing the stage on the one dimension defined relative to the stage causes a displacement in two dimensions within the image data. FIG. 2c shows an illustration of the displacement of a pattern in the image data in the case where the dimensions defined relative to the stage (i.e., the first coordinate system) do not exactly match the dimensions defined relative to the image data (which may, for example, be used as a reference image field and/or define a second coordinate system. In FIG. 2c, a first representation 222 of the pattern from the first image data and a second representation 224 of the pattern from the second image data are shown. While the pattern, according to the dimensions defined relative to the stage, have been displaced in only one dimension (the X dimension/axis), the representation between the image data has been displaced in both dimensions 252/254 defined relative to the image data.

Generally, to determine the rotational offset that triggers the displacement in two dimensions, it is sufficient to determine the offset based on the displacement of the stage in a dimension defined relative to the stage. In order to improve the accuracy of the determination of the rotational offset, and in addition to also determine a scaling offset for both dimensions, the procedure may also be repeated for the second (lateral) dimension defined relative to the stage (which is orthogonal to the first dimension, i.e., X and Y dimensions may be considered). Thus, as shown in FIG. 1b, the method may further include controlling 140 the drive unit to displace the stage in order to displace the stage by a second (predefined) distance in a second dimension defined relative to the stage. The method may further comprise obtaining 150 third image data of the pattern from the imaging device after the pattern has been displaced by the stage 230 of the optical imaging system by a second distance in the second dimension defined relative to the stage.

Once the first, second and optionally third image data are available, the offset between the patterns in the first and second (and optionally third) image data, and in particular the offset between the respective representations of the patterns in the respective image data, is determined 160 in two dimensions 252/254. For example, a first offset between the representations of the pattern in the first and second image data, and a second offset between the representations of the pattern in the second and third image data may be calculated. Alternatively, the second offset may also be determined between the representations of the pattern in the first and third image data.

There are several ways to calculate the offset between the representations of the pattern in the image data. For example, the method may comprise determining the respective position of the representation of the pattern in the respective image data using (appropriate) image processing techniques, wherein the offset is determined based on the positions. Alternatively, the method may comprise calculating a cross-phase correlation between mutually displaced versions of the respective image data, wherein the offset is based on the displacement at which the phase correlation generates the highest peak. In addition to these approaches, there are a variety of other ways to calculate the offset.

The offset, which represents the distance between the position of the representation of the pattern in the different image data, is determined in two dimensions. These two dimensions are not defined relative to the stage, but relative to another reference system. In particular, the calculation of the offset in the two dimensions may be performed in a second coordinate system defined relative to a reference image field. This second coordinate system is, in conjunction with FIGS. 3a to 7, also referred to as a virtual coordinate system, it is flexibly adjustable to the needs of the respective application. In many cases, the second coordinate system will be chosen to match what the user of the optical imaging system sees on a screen of the optical imaging system. For example, as shown in FIG. 2b, the second coordinate system may be a coordinate system of a display 250 of the optical imaging system, i.e., a coordinate system that matches what the user of the optical imaging system sees on the display. This coordinate system mostly also matches the coordinate system of the optical imaging device. Consequently, the second coordinate system may be a coordinate system of a field of view of the optical imaging device.

In some cases, however, it may be advantageous to select the second coordinate system, or more generally the dimensions of the reference image field, both independently of the stage and independently of the optical imaging system display. This is the case, for example, in the example of FIG. 7, in which a corrugated sheet is arranged at a 45° angle (relative to the stage or relative to the coordinate system of the image data or the display). In such cases, it may be helpful if the movement of the stage is synchronized with the alignment of the sample carrier. For example, the second coordinate system may be a user-defined coordinate system. For example, the method may include obtaining a user input, such as via a touch-sensitive screen of the optical imaging system or via another input device, such as a rotary knob, and specifying the second coordinate system based on the user input. Alternatively, the user-defined coordinate system may be specified with software support. For example, the method may include determining geometric structures, particularly lines, in the image data using an image analysis algorithm, and specifying the second coordinate system based on the alignment of the geometric structures.

As previously stated, it may be that the optical imaging device is mounted tilted by 90°, 180° or 270° due to space limitations. The proposed method may recognize this imaging flip by the offset, compared to an expected offset when moving the stage, being larger than expected or negative (instead of positive) in one of the dimensions. For example, as shown in FIG. 1b, the method may include determining 165 the imaging flip of the imaging device based on the offset. For example, the reference image field used to calculate the offset may be based on the imaging flip, i.e., the display of the image data may be flipped based on the imaging flip, and along with the image data, the reference image field may also be flipped. For example, if the offset is expected to be primarily along the X-axis of the second coordinate system, but the established offset is primarily along the Y-axis, it may be assumed that the camera has an imaging flip of 90° or 270°. If the offset is negative in at least one of the dimensions, instead of positive as expected (or vice versa), it may be assumed that the camera has an imaging flip of 180°.

Based on the offset, the conversion parameter may now be calculated. The same may have or map at least one of the following two components, as previously noted: a rotational offset and/or a scaling offset between the first coordinate system and the second coordinate system. The rotational offset may be calculated from the offset by trigonometry, for example, by calculating the adjacent side and the side opposite to an angle of the angle mapping the angular offset from the offset (as the adjacent side) and the predefined distance (as the hypotenuse). The ratio between the side opposite to an angle and the adjacent side may now be used to calculate the tangent of the angle, from which the angle of the angular offset may now be determined. Before that, for the correct determination of the hypotenuse, the scaling offset may still be calculated, from a ratio between an expected offset and the length of the adjacent side. Alternatively, the angular offset may be calculated from the arc cosine of the ratio between the offset in one of the dimensions and the magnitude of the offset in two dimensions (i.e., the vector of the offset). Alternatively, the vector of the offset may already map the rotational offset and thus be used as a conversion parameter, or component thereof. In particular, the conversion parameter may include a conversion vector to convert between the desired displacement along the dimensions defined relative to the reference image field and the corresponding displacement in dimensions defined relative to the stage. The conversion vector may map the rotational offset (via the ratio between the two dimensions of the vector), and optionally further the scaling offset (via the magnitude/scaling of the vector).

In connection with FIGS. 1a to 7, the conversion parameter is used to adjust the control of the drive unit of the stage so that the movement of the stage corresponds to the movement expected by the user. Therefore, the conversion parameter may be adapted to achieve, based on a desired displacement along the dimensions defined relative to the reference image field, a corresponding displacement in dimensions defined relative to the stage to control the stage based on the corresponding desired displacement. In particular, the conversion parameter, with respect to the previously defined first and second coordinate systems, may be adapted to enable a corresponding displacement in the first coordinate system based on a desired displacement in the second coordinate system in order to control the stage based on the corresponding displacement in the first coordinate system.

Accordingly, the conversion parameter may be used to convert between control commands included in an input signal of the input device and control commands sent to the drive unit. Alternatively, the conversion parameter may be transmitted to the drive unit and stored in the drive unit as a calibration parameter. The drive unit 240 for displacing the stage is now controlled 190 based on the conversion parameter. In the former case (the translation of the control commands), the control commands may now be received by the system, translated, and the drive unit controlled accordingly. For example, the method may further comprise obtaining 180 an input signal of the input device (wherein the input signal comprises the control commands). The drive unit for displacing the stage may now be further controlled based on the input signal, for example by translating the control commands from the input signal into corresponding control commands for the drive unit based on the conversion parameter. The assumption here is that the user wants to displace the stage as given by the reference image field (i.e., for example, the display, or the user-defined reference image field). Accordingly, the input signal may be evaluated according to dimensions defined relative to a reference image field, i.e., relative to the second coordinate system. In other words, the input signal may be interpreted as a command from the user to move the stage according to the dimensions of the second coordinate system.

In the previous examples, there was mostly mention of an optical imaging system with an imaging device. However, the proposed concept may also be applied to optical imaging systems with multiple imaging devices, such as a camera-based imaging device and a scanning imaging device. Here, the method may be performed separately for each of the imaging devices, which allows the offset between the stage and the imaging devices to be compensated.

For example, if the optical imaging system includes multiple imaging devices, the method may be performed separately for each imaging device. A separate conversion parameter may be calculated for each imaging device.

To achieve a match of the image fields of the imaging devices, at least also an angular offset between the imaging devices may be calculated from the difference between the different angular offsets between the imaging devices and the stage. A further offset may then be determined from the positions of the pattern in the respective image data, after compensating for the angular offset.

In the proposed optical imaging system, in some embodiments, an imaging device 220 having an optical imaging sensor, also referred to as a camera, is used. Accordingly, the optical imaging sensor may be configured to generate the image data, which in this case is imaging sensor data. For example, the optical imaging sensor of the imaging device 220 may comprise or correspond to an active pixel sensor (APS) or a charge-coupled device-(CCD-) based image sensor. For example, in APS-based image sensors, light is sensed at each pixel using a photodetector and an active amplifier of the pixel. APS-based image sensors are often based on CMOS (Complementary Metal-Oxide-Semiconductor) or S-CMOS (Scientific CMOS) technology. In CCD-based image sensors, incoming photons are converted into electron charges at a semiconductor-oxide interface, which are then moved between capacitive bins (sinks) in the image sensors by an image sensor circuitry in order to perform the imaging.

In some embodiments, a scanning imaging device 220 may be used. In a scanning imaging device, a beam is directed to a plurality of positions of the sample by a beam-guiding element. One or more detectors are used to detect interactions of the beam with the sample, such as reflection, photoemission (in the case of fluorescence), emitted radiation, or electrons. In the case of the confocal microscopy and the two-photon microscopy, the beam is a laser beam; in the case of scanning electron microscopy, the beam is an electron beam. This beam is directed to the different positions of the sample (according to the grid) by means of a beam-guiding element. In the case of the confocal microscopy and the two-photon microscopy, a mirror or other reflective element is mostly used here; in the case of the scanning electron microscopy, coils are used to direct the electron beam.

The system 210 may be configured to obtain (i.e., receive or read out) the sensor data of the imaging device 220 (or the imaging device) from the (respective) imaging device, such as via the interface 212.

The one or more interfaces 212 of the system 210 may correspond to one or more inputs and/or outputs for receiving and/or transmitting information, which may be present in digital (bit) values according to a code within a module, between modules, or between modules of different entities. For example, the one or more interfaces 212 may include interface circuits configured to receive and/or transmit information.

The one or more processors 214 of the system 210 may be implemented using one or more processing units, one or more processing devices, any means for processing, such as a processor, a computer, or a programmable hardware component, which may be operated with accordingly adapted software. In other words: The described function of the one or more processors 214 may as well be implemented in software, which is then executed on one or more programmable hardware components. Such hardware components may include a general-purpose processor (such as a central processing unit), a digital signal processor (DSP), a microcontroller, and so on.

The one or more storage devices 216 of the system 210 may include at least one member selected from the group comprising computer-readable storage media, such as a magnetic or optical storage medium, e.g. a hard disk drive, flash memory, a floppy disk, a random access memory (RAM), a programmable read-only memory (PROM), an erasable programmable read-only memory (EPROM), an electronically erasable programmable read-only memory (EEPROM), or a network storage.

More details and aspects of the method, the system, a corresponding computer program, and the optical imaging system are given in connection with the concept or examples described above or below (such as in connection with FIGS. 3a to 10). The method, the system, the computer program, and the optical imaging system may comprise one or more additional optional features corresponding to one or more aspects of the proposed concept or of the described examples as described above or below.

Several aspects of the present concept relate to a stage calibration. A key idea behind this is to automatically calibrate the rotation between the stage and the camera. For example, one may provide a "virtual" coordinate system for the input device that is based on the alignment of the camera. If the user wants to move to the right in the camera coordinate system, this wish may be converted into the corresponding physical axis movements of the stage. By means of a technical sample (the sample discussed in connection with FIGS. 1a to 2b), which may be moved in the corresponding axes in a well-defined manner by means of the stage, it is possible to determine which displacements are visible in the camera.

The proposed method allows the alignment tolerance of the camera to the stage to be "laxed" during an automatic calibration. While a rotation error of less than 1° is desired for manual alignment, for example, so that this is not negatively noticed when moving the stage using the input device, less than 5° degrees of mechanical alignment is easier to achieve when this is followed by the automatic calibration.

In an optical imaging system with multiple modalities (such as a wide-field microscope and a confocal microscope), there is the additional effort of aligning both modalities to each other and to the stage. Here, automatic calibration may enable one virtual coordinate system each for wide-field and confocal microscopy. As a result, the user may easily and consistently move in the canonical directions (left, right, up, down) in both modalities without having the problem in one modality of a method moving both image axes in one direction.

Figure 3A:
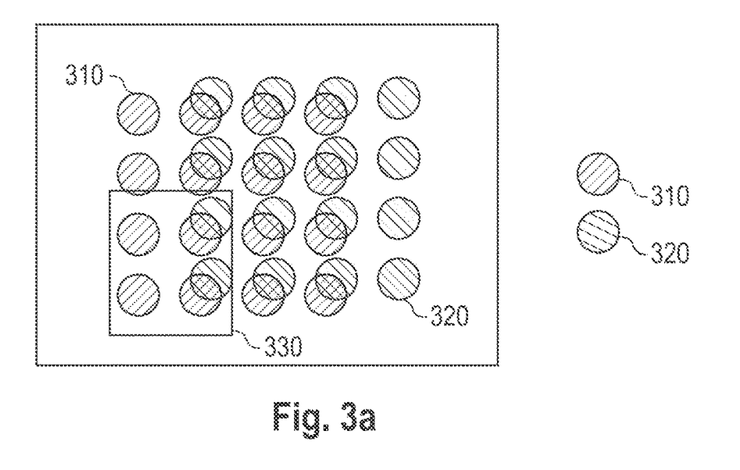
FIGS. 3a and 3b show schematic illustrations of an effect of pure movement along the X-axis of the stage with a sample, without and with the use of the proposed movement correction.
Figure 3B:
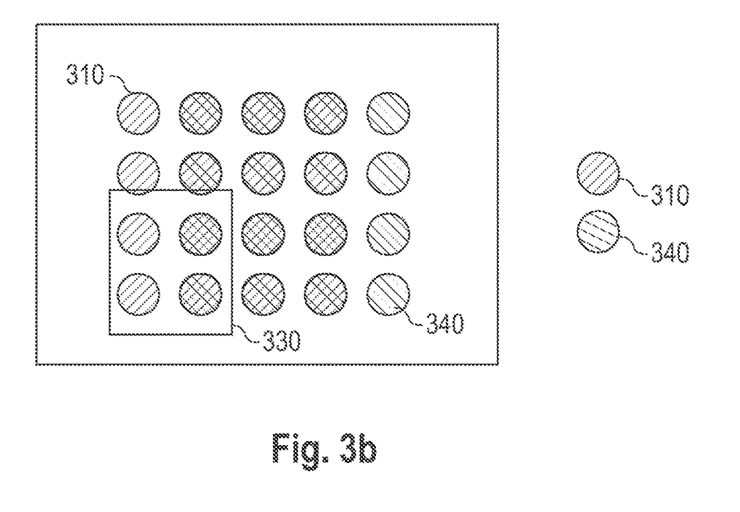

FIGS. 3a and 3b show schematic illustrations of an effect of pure movement along the X-axis of the stage with a sample (the pattern), without and with the use of the proposed movement correction. Here, the initial location 310 and the location after movement 320; 340 are shown, with FIG. 3a showing the location 320 after movement without movement correction and FIG. 3b showing the location 340 after movement without movement correction. Only the stage moves and not the camera and thus its field of view 330. As may be seen in FIG. 3a, if the axes of the stage are not parallel to the axes of the sensor, a pure X-axis movement additionally triggers an offset of the Y-axis. If this movement is understood beforehand and the movement of the stage is corrected accordingly (by the conversion parameter), the pure X movement relative to the sensor would have been performed, as shown in FIG. 3b.

Figure 4A:
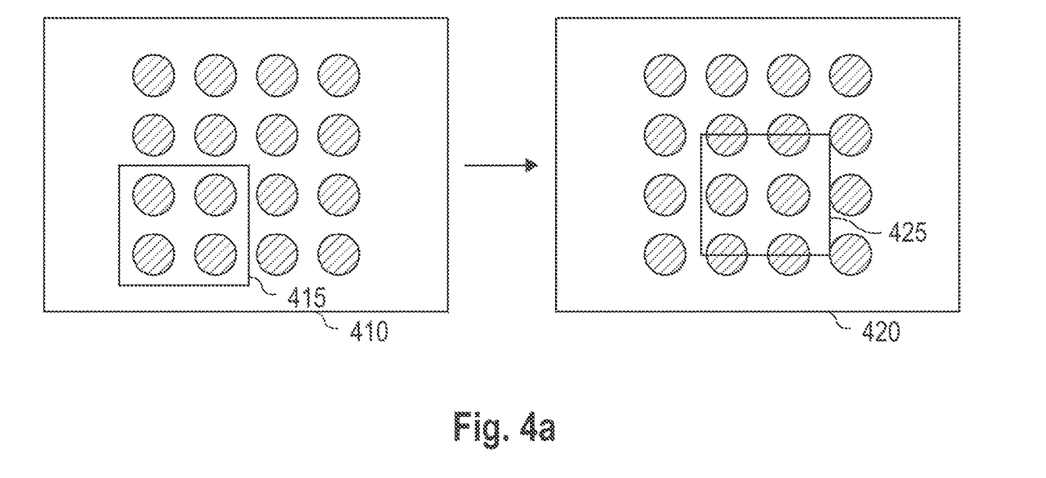
FIGS. 4a and 4b show further schematic illustrations of an effect of pure movement along the X-axis of the stage with a sample, without and with use of the proposed movement correction.
Figure 4B:
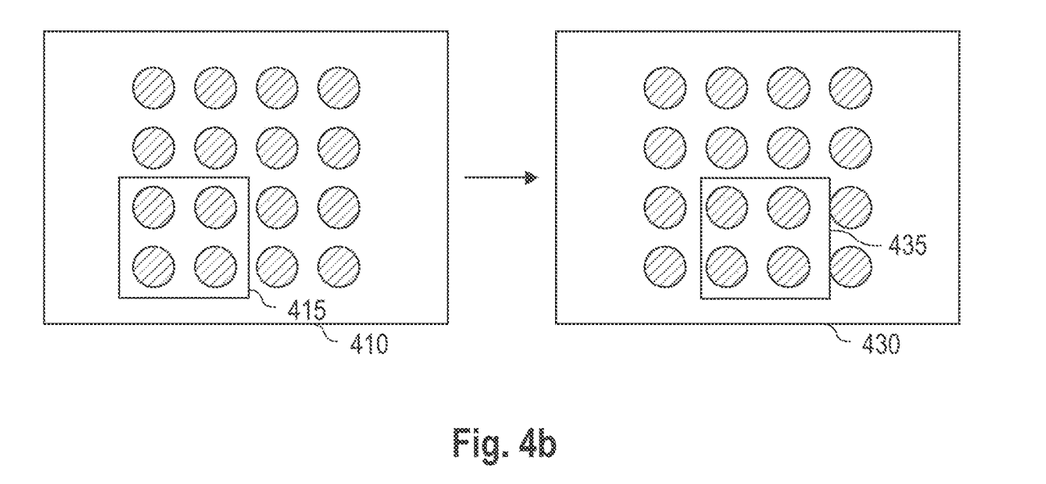

In FIGS. 4a and 4b, the same behavior is shown. FIGS. 4a and 4b show further schematic illustrations of an effect of pure movement along the X-axis of the stage with a sample (the pattern), without and with the use of the proposed movement correction. Unlike in FIGS. 3a and 3b, in FIGS. 4a and 4b, the image field 415; 425; 435 is moved in order to display the desired effect more comprehensibly. In FIG. 4a, the original image field 415 is shown at the original position 410 of the stage. After moving the stage along the X-axis, at the displaced position 420 of the stage, the image field 425 is displaced along both the X-axis and the Y-axis. This is different in FIG. 4b, however, where the movement correction is performed. There, after moving the stage along the X-axis at the displaced position 430 of the stage, the image field 435 is displaced only along the X-axis.

Figure 5:
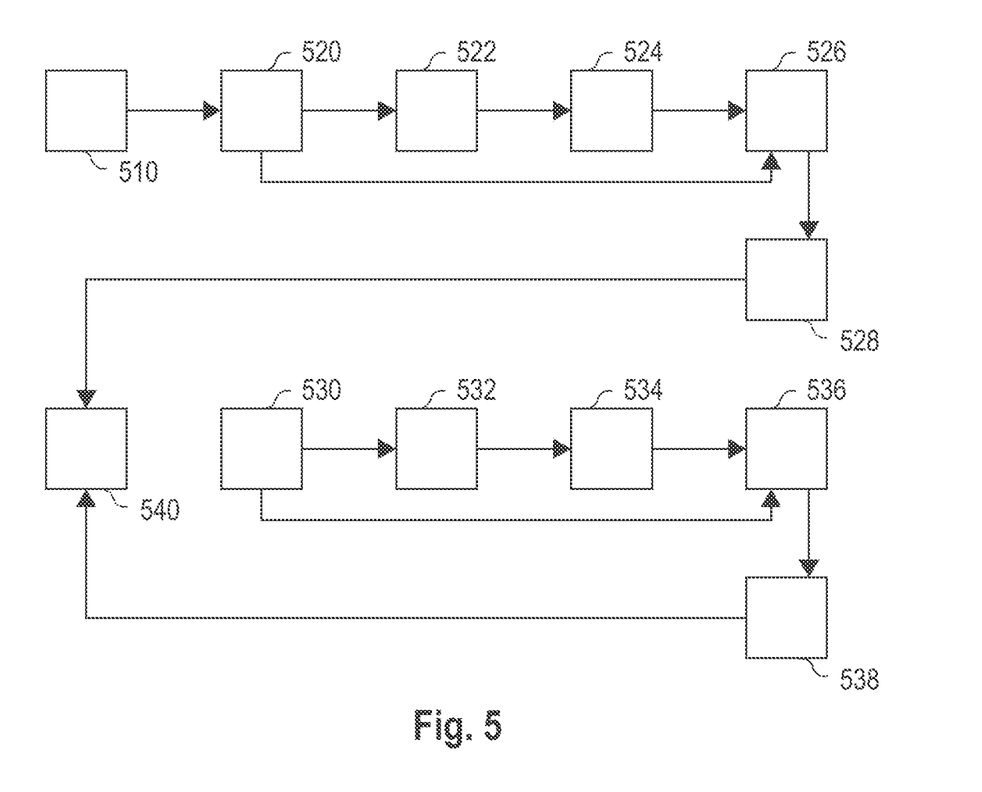
FIG. 5 shows a flowchart of an example of a sequence of the calibration for determining a virtual coordinate system.

FIG. 5 shows a flowchart of an example of a sequence of the calibration for determining a virtual coordinate system (which may correspond to the second coordinate system as described in connection with FIGS. 1a to 2b). This focuses on the target 510, and the normal (the pattern shown in FIGS. 3a to 4b as a grid structure, but it may also be an L-shape as shown in FIG. 2b) is recorded in the initial position and established in the detector image 520. Then the stage is moved in one axis 522 (here the X-axis) and the normal is recorded again and established in the detector image 524. Then the deviation (i.e., offset) may be established 526 based on the two positions of the normal in the detector images. From these two images, in particular from the deviations between the position of the normal on the two images, the exact physical step size of the stage relative to the detector may then be determined on the one hand (for example as a movement of n pixels to the right) and the deviation of the movement along the Y-axis from the expected pure movement on the X-axis may be calculated 528. This is repeated with the second axis orthogonal thereto, by determining 530 the position of the normal in a first detector image, displacing 532 the stage along the second axis (here the Y axis), determining 534 the position of the normal in a second detector image, calculating 536 the deviation, and determining 538 the deviation of the movement along the X axis from the expected pure movement on the Y axis. From both deviations to the respectively expected pure movement on one of the axes, the virtual coordinate system may now be determined 540. The two deviations together result in a description for the corrected movement relative to the imaging system. The movement control commands to the stage may be easily converted with these parameters (i.e., the conversion parameter), so that, for example, the input of the input device no longer linearly controls one of the axis motors but allows the expected movement in the direction of the imaging, through a 2-axis interpolation.

Figure 6:
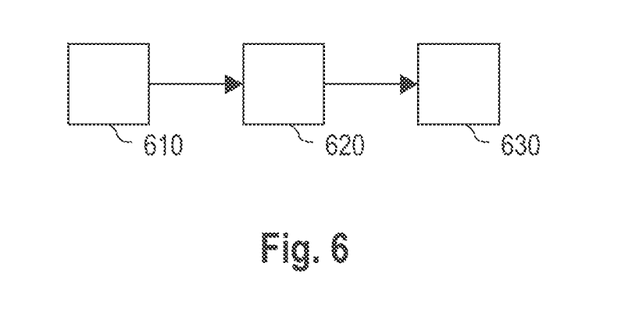
FIG. 6 shows a flowchart of an example for the sequence of controlling a stage.

FIG. 6 shows a flowchart of an example for the sequence of controlling the stage. Here, for a control command 610 to move the stage, a corrected axis movement for the current virtual coordinate system is calculated 620, resulting 630 in the actual movement of the stage.

The virtual coordinate system also allows easy transformation to another system. Here, only the applied parameter set changes, but not the sequence.

Figure 7:
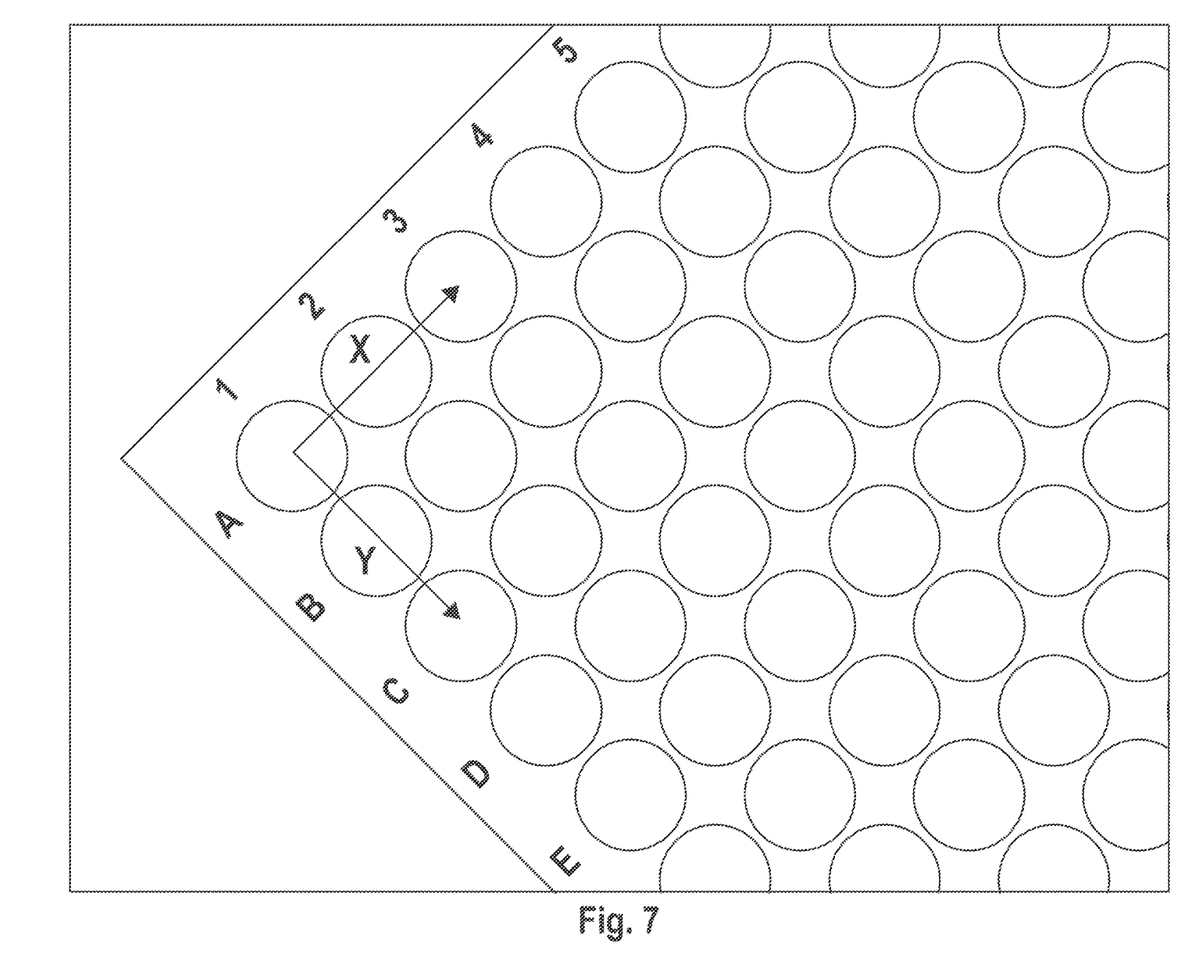
FIG. 7 shows a schematic representation of a corrugated sheet in the field of view of a camera, with the corrugated plate rotated by 45°.

In one variant of the presented stage control, it is possible to deviate from interpreting the control commands for the stage according to the axes of the representation of the camera. FIG. 7 shows a schematic representation of a corrugated sheet in the field of view of a camera, with the corrugated sheet rotated by 45°. Here, it may be useful to define any virtual coordinate system that extends along the X and Y axes shown in FIG. 7, i.e., at a 45° angle to the coordinate system of the representation. This virtual coordinate system may now be used to control the stage movement, along the X and Y axes shown here. Imagining the center of the image at A1, a movement of the input device in the X-axis would cause a movement along the drawn X-axis.

More details and aspects of the stage calibration concept are given in conjunction with the concept or examples described above and below (e.g., FIG. 1a to 2b, 8 to 10). The concept for calibration may comprise one or more additional optional features corresponding to one or more aspects of the proposed concept or of the described examples as described above or below.

Figure 8:
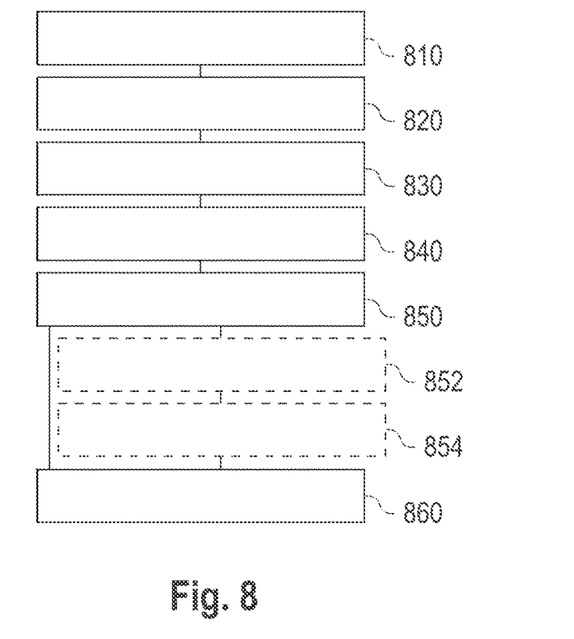
FIG. 8 shows a flowchart of an example of a further method for an optical imaging system.

FIG. 8 illustrates a flowchart of an example of a further method for an optical imaging system. The method of FIG. 8 may be implemented in many aspects similarly to the method as discussed in the previous figures, and in particular in FIGS. 1a and 1b. Further, the method may be performed by the system 210, such as in conjunction with the optical imaging system 200 of FIGS. 2a and 2b. The method comprises obtaining 810 first image data of an imaging device 220 of the imaging system, the first image data comprising a representation 222 of a pattern 236. The method further comprises obtaining 820 second image data of the pattern from the imaging device after the pattern has been displaced by a stage 230 of the optical imaging system by a distance in a dimension 232/234 defined relative to the stage. The method further comprises determining 830 an offset 226 between the patterns of the first and second image data in two dimensions 252; 254. The method further comprises calculating 840 a conversion parameter based on the offset 226 and the distance.

Up to this point, the method of FIG. 8 corresponds to the method of FIGS. 1a and 1b and may be implemented similarly accordingly. In the examples of the previous figures, the approach chosen was to transform the specific control instructions of the input device to the stage to obtain the desired movement. Another option, which is shown in conjunction with FIGS. 8 and 9, is to leave the control of the stage via the input device unchanged and instead transform the camera image accordingly.

By way of derogation from, or in addition to, the method of FIGS. 1a and 1b, the method of FIG. 8 now further comprises transforming 850 image data of the imaging device 220 based on the conversion parameter to obtain transformed image data. Unlike in the method described in conjunction with FIGS. 1a to 7, the control of the stage is not (exclusively) adjusted here, but the representation of the image data is adjusted. To further ensure that when the stage is controlled, the display image changes as expected, the image data of the imaging device may be rotated according to the conversion parameter so that the rotational offset between the stage and the image data is compensated. Accordingly, transforming 850 the image data may include rotating 852 the image data based on the conversion parameter. If the stage is now moved in one of the dimensions of the stage, the displayed image also only moves in one dimension.

Figure 9:
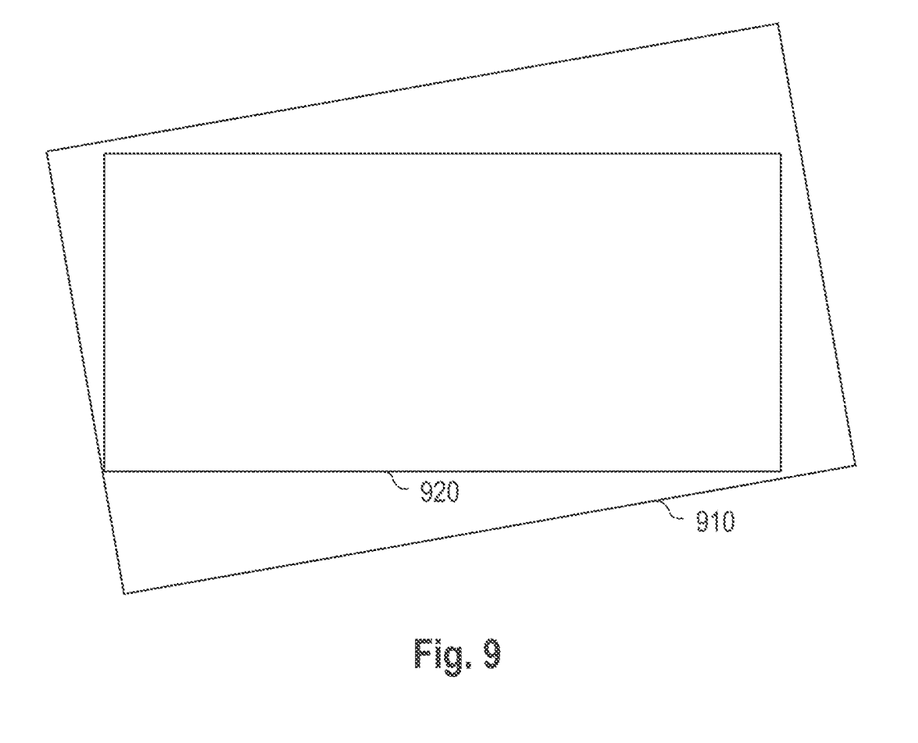
FIG. 9 shows an example of a representation of a rotated and cropped camera image.

As may be seen in FIG. 9, rotating the image data creates areas in which no image data is represented. To avoid such areas, the image data may be enlarged, and the image section may be selected such that the areas are not displayed. Thus, transforming 850 the image data may include cropping 854 the rotated image data, such as to avoid outputting areas where no image data is represented.

FIG. 9 shows an example of a representation of a rotated and cropped camera image. The camera image 910, as shown in FIG. 9, may here be rotated to compensate for the rotation relative to the stage and then cropped to a section 920 of the rotated camera image. This performs an alignment of the respective camera. In FIG. 9, the twist is exaggerated for illustrative purposes; in practice, the rotational offset is usually smaller.

The transformed image data may now be output via display 250 of the optical imaging system. The method includes providing 860 a display signal with the transformed image data. For example, the display signal may be a video or control signal to drive the display 250 of the optical imaging system and to output the display signal with the transformed image data thereover. Accordingly, the one or more interfaces 212 of the system 210 may include a video interface.

More details and aspects of the method, the system configured to perform the method, the optical imaging system, and a corresponding computer program are described in connection with the concept or examples mentioned before or after (e.g., FIGS. 1a to 7, 10). The method, the system, the optical imaging system, and the computer program may comprise one or more additional optional features corresponding to one or more aspects of the proposed concept or of the described examples as described above or below.

Figure 10:
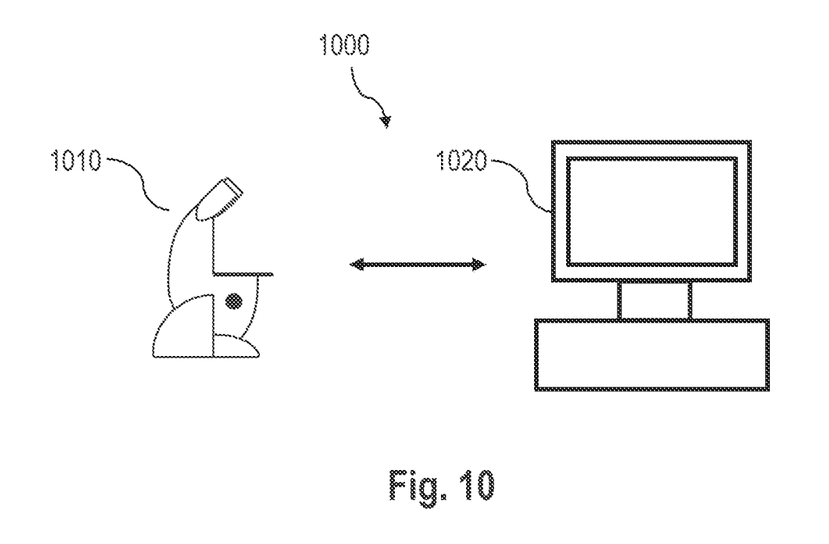
FIG. 10 shows a schematic diagram of an example of a system with an optical imaging device and a computer system.

Some embodiments relate to an optical imaging system or an optical imaging device, such as a microscope system or microscope comprising a system as described in connection with one or more of FIGS. 1a to 9. Alternatively, an optical imaging device, such as a microscope, may be part of a system, such as in connection with one or more of FIGS. 1a to 9, or be connected to the same. FIG. 10 shows a schematic representation of a system 1000 configured to perform a method described herein. The system 1000 includes an optical imaging device 1010, such as a microscope (such as a scanning microscope or a non-scanning microscope), and a computer system 1020. The optical imaging device 1010 is configured to capture images and is connected to the computer system 1020. The computer system 1020 is configured to perform at least a part of a method described herein. The computer system 1020 may be configured to execute a machine learning algorithm. The computer system 1020 and the optical imaging device 1010 may be separate entities but may also be integrated together in a common housing. The computer system 1020 could be part of a central processing system of the optical imaging device 1010 and/or the computer system 1020 could be part of a subcomponent of the optical imaging device 1010, such as a sensor, an actuator, a camera, or an illumination unit, etc. of the optical imaging device 1010.

The computer system 1020 may be a local computer device (e.g., personal computer, laptop, tablet computer, or cell phone) having one or more processors and one or more storage devices, or may be a distributed computer system (e.g., a cloud computing system having one or more processors or one or more storage devices distributed at various locations, for example, at a local client and/or one or more remote server farms and/or data centers). The computer system 1020 may comprise any circuit or combination of circuits. In one embodiment, the computer system 1020 may include one or more processors, which may be of any type.

As used herein, processor may mean any type of computing circuit, such as, but not limited to, a microprocessor, a microcontroller, a complex instruction set microprocessor (CISC), a reduced instruction set microprocessor (RISC), a very long instruction word (VLIW) microprocessor, a graphics processor, a digital signal processor (DSP), a multi-core processor, a field programmable gate array (FPGA), e.g., of a microscope or a microscope component (e.g., camera), or any other type of processor or processing circuit. Other types of circuits that may be included in the computer system 1020 may be a custom-built circuit, an application-specific integrated circuit (ASIC), or the like, such as one or more circuits (e.g., a communication circuit) for use in wireless devices such as cell phones, tablet computers, laptop computers, two-way radios, and similar electronic systems. The computer system 1020 may include one or more storage devices, which may include one or more storage elements suitable for the respective application, such as a main memory in the form of a random access memory (RAM), one or more hard disks, and/or one or more drives that handle removable media, such as CDs, flash memory cards, DVDs, and the like. The computer system 1020 may also include a display device, one or more speakers, and a keyboard and/or controller, which may include a mouse, trackball, touch screen, voice recognition device, or any other device that allows a system user to input information into and receive information from the computer system 1020.

Some or all of the method steps may be executed by (or using) a hardware device, like for example, a processor, a microprocessor, a programmable computer, or an electronic circuit. In some embodiments, one or more of the most important method steps may be executed by such a device.

Depending on certain implementation requirements, embodiments of the invention may be implemented in hardware or software. The implementation may be performed using a nonvolatile storage medium such as a digital storage medium, such as a floppy disk, a DVD, a Blu-Ray, a CD, a ROM, a PROM and EPROM, an EEPROM, or a FLASH memory, on which electronically readable control signals are stored that interact (or are capable of interacting) with a programmable computer system such that the respective method is performed. Therefore, the digital storage medium may be computer readable.

Some embodiments according to the invention include a data carrier having electronically readable control signals that may interact with a programmable computer system so as to perform any of the methods described herein.

In general, embodiments of the present invention may be implemented as a computer program product having a program code, the program code being effective to perform any of the methods when the computer program product is running on a computer. For example, the program code may be stored on a machine-readable carrier.

Further embodiments include the computer program for performing any of the methods described herein stored on a machine-readable carrier.

In other words, an embodiment of the present invention is therefore a computer program having a program code for performing any of the methods described herein when the computer program is running on a computer.

Thus, another embodiment of the present invention is a storage medium (or a data carrier or a computer readable medium) comprising a computer program stored thereon for executing any of the methods described herein when executed by a processor. The data carrier, the digital storage medium or the recorded are usually tangible and/or not transitional. Another embodiment of the present invention is a device as described herein including a processor and the storage medium.

Thus, another embodiment of the invention is a data stream or signal sequence representing the computer program for performing any of the methods described herein. For example, the data stream or signal sequence may be configured to be transmitted over a data communication link, such as the Internet.

Another embodiment comprises a processing means, for example, a computer or programmable logic device, configured or adjusted to perform any of the methods described herein.

Another embodiment includes a computer having installed thereon the computer program for performing any of the methods described herein.

Another embodiment according to the invention includes a device or system configured to transmit (for example, electronically or optically) a computer program for performing any of the methods described herein to a receiver. For example, the receiver may be a computer, a mobile device, a storage device, or the like. For example, the device or system may include a file server for transferring the computer program to the receiver.

In some embodiments, a programmable logic device (e.g., a field programmable gate array, FPGA) may be used to perform some or all of the functionalities of the methods described herein. In some embodiments, a field programmable gate array may cooperate with a microprocessor to perform any of the methods described herein. In general, the methods are preferably performed by any hardware device.

REFERENCE SIGN

110 Obtaining first image data
120 Controlling a drive unit
130 Obtaining second image data
140 Controlling the drive unit
150 Obtaining third image data
160 Determining an offset
165 Determining a mapping flip
170 Determining a conversion parameter
180 Receiving an input signal
190 Controlling a drive unit
200 Optical imaging system
210 System
212 Interface
214 Processor
216 Storage device
220 Optical imaging device
222 First representation of a pattern
224 Second representation of a pattern
226 Offset
230 Stage
232; 234 Dimensions defined relative to the stage
236 pattern
240 Drive unit
250 Display
252; 254 Dimensions defined relative to the display
260 Input device
310 Initial location
320 Location after movement
330 Image field
340 Location after movement
410 Original position of the stage
415; 425; 435 Image field
420 Displaced position of the stage 430 Displaced position of the stage
510 Focusing on target
520 Determining normal in detector image
522 Stage method
524 Determining normal in recaptured detector image
526 Determining the deviation
528 Calculating a deviation along the Y axis
530 Determining normal in detector image
532 stage method
534 Determining normal in recaptured detector image
536 Determining the deviation
538 Calculating a deviation along the X axis
540 Determining a virtual coordinate system
610 Control command
620 Calculating a corrected axis movement
630 Resulting movement of the stage
810 Obtaining first image data
820 Obtaining second image data
830 Determining an offset
840 Determining a conversion parameter
850 Transforming image data
852 Rotating the image data
854 Cropping the rotated image data
860 Providing a display signal
910 Camera image
920 Section
1000 System
1010 Optical imaging device
1020 Computer system

The invention claimed is:

1. A method for an optical imaging system, the method comprising:
obtaining first image data of an imaging device of the imaging system, the first image data comprising a representation of a pattern;
obtaining second image data of the pattern from the imaging device after the pattern has been displaced by a stage of the optical imaging system by a distance in a dimension defined relative to the stage;
determining an offset between the patterns of the first and second image data in two dimensions;
calculating a conversion parameter based on the offset and the distance; and
controlling a drive unit for displacing the stage based on the conversion parameter.

2. The method of claim 1, wherein the dimension defined relative to the stage is defined by a first coordinate system of the stage and the calculation of the offset in the two dimensions is performed in a second coordinate system defined relative to a reference image field.

3. The method of claim 2, wherein the conversion parameter is adapted to enable a corresponding displacement in the first coordinate system based on a desired displacement in the second coordinate system in order to control the stage based on the corresponding displacement in the first coordinate system.

4. The method of claim 2, wherein the conversion parameter maps at least one of a rotational offset and a scaling offset between the first coordinate system and the second coordinate system.

5. The method of claim 2, wherein the second coordinate system is a coordinate system of a display of the optical imaging system and/or a coordinate system of an image field of the optical imaging device.

6. The method of claim 2, wherein the second coordinate system is a user-defined coordinate system.

7. The method of claim 1, wherein the conversion parameter is adapted to achieve, based on a desired displacement along the dimensions defined relative to a reference image field, a corresponding displacement in dimensions defined relative to the stage to control the stage based on the corresponding desired displacement.

8. The method of claim 1, further comprising obtaining an input signal of an input device of the optical imaging system, wherein the drive unit for displacing the stage is further controlled based on the input signal.

9. The method of claim 1, further comprising determining an imaging flip of the imaging device based on the offset, wherein a reference image field used to calculate the offset is based on the imaging flip.

10. The method of claim 1, further comprising obtaining third image data of the pattern from the imaging device after the pattern has been displaced by the stage of the optical imaging system by a second distance in a second dimension defined relative to the stage, wherein determining the offset and calculating the conversion parameter are further based on the displaced representation of the pattern of the third image data.

11. The method of claim 1, wherein, if the optical imaging system comprises multiple imaging devices, the method is performed separately for each imaging device, wherein a separate conversion parameter is calculated for each imaging device.

12. A system for an optical imaging system, the system comprising one or more processors and one or more storage devices, the system being configured to perform the method according to claim 1.

13. A non-transitory, computer-readable medium comprising a program code that, when the program code is executed on a processor, a computer, or a programmable hardware component, causes the processor, computer, or programmable hardware component to perform the method of claim 1.

14. A method for an optical imaging system, the method comprising:
obtaining first image data of an imaging device of the imaging system, the first image data comprising a representation of a pattern;
obtaining second image data of the pattern from the imaging device after the pattern has been displaced by a stage of the optical imaging system by a distance in a dimension defined relative to the stage;
determining an offset between the patterns of the first and second image data in two dimensions;
calculating a conversion parameter based on the offset and the distance; and
transforming image data of the imaging device based on the conversion parameter to obtain transformed image data; and
providing a display signal with the transformed image data.

15. The method of claim 14, wherein transforming the image data comprises rotating the image data based on the conversion parameter and cropping the rotated image data.

16. A system for an optical imaging system, the system comprising one or more processors and one or more storage devices, the system being configured to perform the method according to claim 14.

17. A non-transitory, computer-readable medium comprising a program code that, when the program code is executed on a processor, a computer, or a programmable hardware component, causes the processor, computer, or programmable hardware component to perform the method of claim 14.

* * * * *